June 14, 1949.　　　　O. JACOBSEN　　　　2,473,061
SHAFT SEAL
Filed Oct. 4, 1943
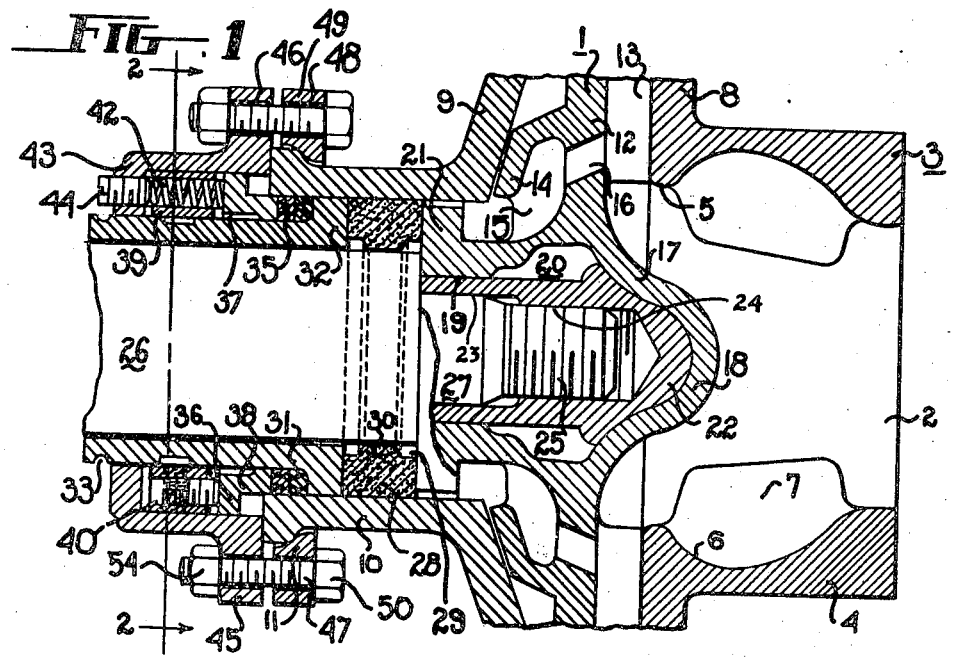
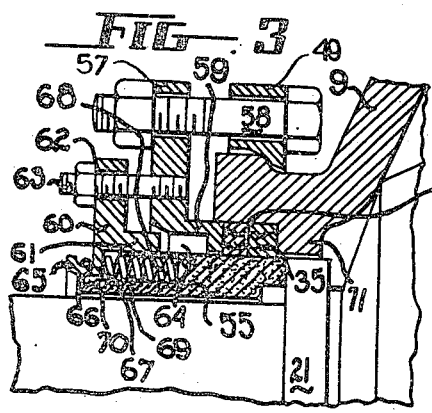
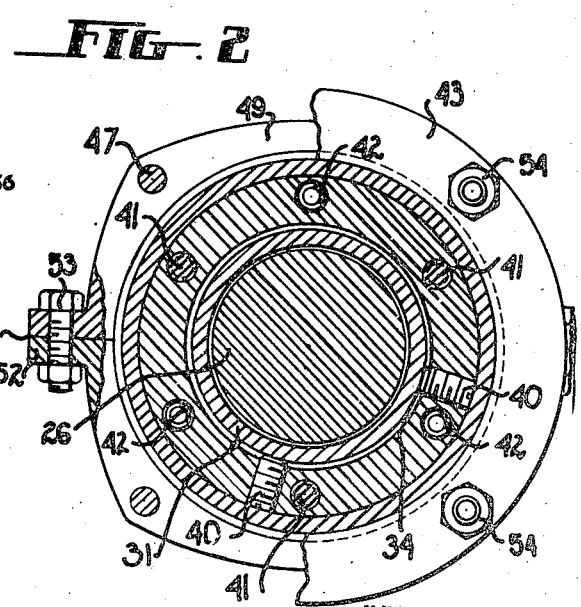
INVENTOR
OYSTEIN JACOBSEN
BY
Toulmin + Toulmin
ATTORNEYS Patented June 14, 1949

2,473,061

UNITED STATES PATENT OFFICE 2,473,061

SHAFT SEAL

Oystein Jacobsen, Montgomery County, Ohio, assignor to The Duriron Company, Inc., Dayton, Ohio, a corporation of New York Application October 4, 1943, Serial No. 504,826

6 Claims. (Cl. 103—111)

The present invention relates to centrifugal pumps, and more particularly to seals of those pumps designed to operate at considerable velocities and which are adapted to handle corrosive fluids.

When employing a pump for conveying acid-containing solutions, all parts of the pump which come into contact with the corrosive liquid are usually fabricated of non-attackable metal such as silicon iron. Metal of this character is so hard that it is practically unmachinable, so that for the pump shafts it is necessary to use a machinable metal such as high carbon steel and take unusual precaution in preventing the acid from reaching the shaft. In many standard forms of pumps the impeller is mounted on an overhanging journal which is usually constituted of two or more sets of ball bearings and in which the inner ball bearing is positioned not far from the impeller. This consideration makes it all the more necessary that the interior of the casing shall be effectively sealed from the shaft, which extends beyond the casing toward the ball bearings, so that none of the liquid can reach the bearings to impair their effectiveness.

In order to prevent creepage of the corrosive fluid along the pump shaft toward the bearings, it is customary to provide a seal member such as packing rings which exerts a sealing effect in the end thrust and radial directions. A gland is usually provided to take up the wear at the seal, and the arrangement is such under normal conditions that the gland affects both seal surfaces. Consequently should a leak occur past only one of the surfaces, tightening of the gland may apply not only tightening pressure against the leaking surface but also undue pressure against the other surface, which requires no tightening effect, and thus introduces unnecessary friction and wear. It is therefore very desirable in applying seals of this character to centrifugal pumps and particularly those handling corrosive fluids in which the matter of creepage is a very serious item to provide a sealing structure which permits independent adjustment of the end thrust and radial sealing surfaces so that tightening effects are applied only to those surfaces where they are necessary.

Again, in order to improve the character of the end thrust sealing effects it has been proposed to employ a sealing ring integrally secured to the shaft and bring a graphite sealing member into contact with the sealing ring. Sometimes this sealing ring is fabricated separate from the shaft and then later secured thereto in any suitable manner, for example by a swetting operation. While this construction operates quite satisfactorily I have found in accordance with the present invention that the sealing ring can be applied less expensively to the body of the impeller instead of the shaft, in fact, it may be cast integral with the impeller and to that extent reduces the cost of the pump construction as a whole.

Accordingly, the primary object of the invention is to provide an improved seal employing a sealing ring formed integral with the impeller and in which the seal not only effectively serves to prevent the flow of liquid in the end thrust and radial directions, but which also provides for separate adjustment of the thrust and radial sealing effects.

Another object of the invention is to provide a relatively simple but highly effective seal in which the parts may be readily fabricated with a minimum amount of machine work necessary and thereafter readily assembled and adjusted.

The general object of the invention is to provide such a structure as may be applied to high velocity pumps operating on corrosive fluids and in which sealing effects against creepage in the radial and longitudinal directions are positively obtained so that none of the acid-containing solution is permitted to reach the attackable parts of the shaft and bearings.

The invention will be better understood when reference is made to the following description and the accompanying drawings, in which:

Figure 1 represents a fragmentary sectional view taken along the length of the impeller and the casing, and showing the shaft in elevation for clearness;

Figure 2 is a transverse sectional view of the structure shown in Figure 1 as seen along the line 2—2 in the direction of the arrows. Certain parts of the structure has been broken away so that the hidden parts may be seen;

Figure 3 is a fragmentary cross-sectional view of a modified form of the sealing structure.

Referring more particularly to Figure 1, reference character 1 generally designates a so-called double shrouded form of pump having an intake 2 and provided with a casing 3 which terminates in a volute chamber (not shown) from which a pressure outlet extends. The intake 2 is contained within a cylindrical body 4 having a large central opening 5 which may take on a bulged or curvilinear configuration in a longitudinal direction as indicated at 6. Flat lugs 7 extending lengthwise of the body 4 may be secured along the opening 5 at the bulged surface, the purpose of these lugs being to prevent swirling and eddy current effects in the liquid which is passing into the pump.

The casing 3 may include a flat front wall 8 and a conical shaped rear wall 9, these walls being positioned at opposite sides of the pump impeller. The wall 9 of the casing terminates in a longitudinally extending cylindrical portion 10 which is provided at the end remote from the casing with an enlarged flange 11. The purpose of this enlargement will be explained hereinafter.

The impeller may comprise of a vertically positioned web 12 to which is secured on the front side thereof a number of equidistantly positioned vanes or blades 13 arranged in edge-wise relation. The web is provided at its rear with an inwardly extending overhanging portion 14, the shape of which is such that it fits the conical surface of the rear casing wall 9 with little or no friction when the impeller is rotated. A number of blades 15 positioned edgewise and arranged equidistantly about the impeller are contained within the recess formed by the overhanging portion 14, the purpose of these blades being to give a suction effect at the rear of the impeller and thus reduce the quantity of liquid that tends to leak to the rear and which might normally find its way to the shaft and the bearings.

Openings 16 are cast by coring in the web 12, these openings communicating between the spaces at the rear and front sides of the impeller. Thus the suction effect produced by the rear blades 15 will cause leakage fluid to pass through the openings 16 and to join the main fluid which is being forced out of the pump by the main blades 13.

The impeller web 12 radiates from a centrally disposed hollow hub member 17 which terminates at the front end preferably in a hemispherical knob 18 by which the incoming fluid is given the proper direction in moving through the pump. The hub 17 is cored to provide a cylindrical opening 19 which leads into a larger opening 20 of such shape that as much metal as possible is removed from the hub without reducing its necessary strength. The hub 17 terminates at the left hand end in an outwardly extending circular flange 21, the rear face of which serves as one of the sealing surfaces. The flange 21 has an external diameter somewhat less than the interior diameter of the cylindrical extension 10 of the casing as will be seen from the drawing.

It will be understood that all of the parts described up to this point are preferably made of a metal which is non-attackable by acid, and in this connection I have found that silicon iron is satisfactory. However, metal of this character is practically unmachinable so that any parts that require a fairly close fit must be made of a different material. For this reason there is contained within the openings 19 and 20 a cylindrical liner 22, the outer periphery of which conforms to the shape and size of the opening 19 and also to the shape of the interior surface of the knob 18 on the hub 17. This liner is bored out to form two cylindrical openings 23 and 24 of different sizes, the bore 24 being threaded to receive the threaded end 25 of a driving shaft 26. The shaft is provided with a reduced diameter portion 27 which fits snugly in the opening 23 of the liner. The latter is made fast to the hub 17 in any suitable manner so that when the threaded portion of the liner receives the end of the shaft 26, the impeller is firmly secured to the shaft. The latter is journaled on one or more sets of bearings, usually of the frictionless or ball bearing type, and positioned remote from the impeller so as to permit the impeller end of the shaft to overhang the bearings.

It has been explained hereinbefore that it is highly desirable and in the case of pumping acid containing liquids absolutely necessary that none of the liquid be permitted to creep along the shaft and to enter the bearings. It will be understood that the shaft and the associated bearings are usually made of machinable metal which is greatly susceptible to attack by acid.

In accordance with the present invention an improved form of seal is provided which not only prevents longitudinal leakage but also radial leakage, and the arrangement is such that independent adjustments can be made at either of the leakage surfaces.

Immediately adjacent the left hand or outermost surface of the flange 21 there is provided a thick ring 28 of a self-lubricating material such as graphite. This ring fits snugly within the cylindrical extension 10 of the casing, and in turn loosely receives the shaft 26. There is a pair of oppositely disposed annularly shaped recesses 29 formed at the inner-periphery surface of the ring so as to leave a centrally disposed radially extending projection 30. This projection is of limited width so as to reduce any friction between the ring and the shaft 26.

A cylindrical metal member 31 loosely surrounds the shaft 26 and is provided in its right hand end (Figure 1) with an outwardly extending flange 32 which bears against the left hand side of the surface of the graphite ring 28. The outside diameter of the flange 32 is such as to fit without any undue play the interior diameter of the cylindrical extension 10.

The left hand end of the cylinder 31 may be provided with a relatively shallow semi-circular groove 33 the purpose of which is to prevent the creepage of fluid along the outer surface of the cylinder. In addition to the groove 33, the cylinder 31 is provided at a position approximately one-third of its length from the left hand end with a shallow annular groove 34 of rectangular cross-section. The purpose of this groove will be explained presently.

A plurality (two as shown) of packing rings 35 may be inserted within the annular recess formed between the cylinder 31 and the inside surface of the cylindrical extension 10. These rings bear against the flange 32 and are for the purpose of preventing even the slightest amount of creepage of acid-containing fluid along the surface against which the packing rings bear. While these rings may be made of any suitable material, I have found that synthetic rubber serves this purpose satisfactorily, such as Thiokol, Perbunan, or neoprene.

The packing rings are maintained in their longitudinal position by means of a gland 36 having an undercut bore as indicated at 37 and provided with an extension 38 which is adapted to be loosely received by the recess containing the packing rings. Directly to the left of the gland 36 there is a metal ring 39 which fits fairly snugly over the cylindrical member 31. This metal ring is symmetrically positioned on the cylinder 31 with respect to the annular groove 34. As shown in Figure 2, there are two threaded openings entering the ring at approximately 90° apart, these openings being adapted to receive headless set screws, the ends of which enter the groove 34 and thus prevent longitudinal movement of the ring with respect to the cylinder 31. The ring is also provided with a plurality of equidistantly positioned openings passing lengthwise through the ring at approximately midway between the outer and inner peripheries thereof.

The three alternate openings are threaded to receive headless set screws 41 which bear against the gland member 36. The remaining three alternate openings contain compression springs 42 which have an extended length somewhat greater than the width of the ring, and the inner ends of the springs 42 also bear against the gland 36.

In order to present compressional force against the three springs 42, a cylindrical cap member 43 is employed containing set screws 44 at positions directly in line with the springs. The cap member fits fairly snugly over the cylindrical member 31 and is provided with a bore of such size as to receive the ring 39 and the outermost diameter of the gland 36.

In order to maintain the cap 43 in its longitudinal position it is provided with a radially extending flange portion 45 provided with equidistantly disposed openings 46 about the flange loosely to receive the shanks of the bolts 47. These bolts extend through openings 48 formed in a split clamp ring 49 against which the heads 50 of the bolts bear.

The ring 49 is split at the joint 51 (Figure 2) and is provided with lugs 52 at the two diametric positions to accommodate a pair of clamp bolts 53. The ring 49 has an interior dimension and configuration such that when the two parts of the ring are bolted together at 53 the ring will secure itself to the enlarged portion 11 of the cylindrical extension 10. Consequently, when the bolts 47 are tightened at the nuts 54, the cap member 43 is drawn toward the left hand end of the cylindrical portion 10 and is held firmly in this position.

Assuming that all of the various parts as described have been assembled in the position shown in Figure 1 and the bolts 53 and 47 have been tightened, also the set screws 40 and 41 have been tightened, it is apparent that any tightening of the set screws 44 will cause the springs 42 to compress and tend to force the bland member 36 to move to the right against the packing rings 35. Since these rings are of an elastic character they will fill out the space within the annular recess and will completely block the passage of any fluid along the surfaces with which they come into contact. Increased tightening of the screws 44 will also cause the packing rings 35 to exert a push to the right on the flanged cylindrical member 31 with respect to the shaft 26 and thus cause the right hand surface of the flange 32 to bear more tightly against the sealing ring 28. This in turn causes greater pressure to be exerted by the sealing ring on the sealing flange 21 of the impeller casting. Consequently, by tightening up on the screws 44 compressional force may be exercised both on the packing rings 35 and on the graphite sealing ring 28.

In impellers of this character there is the tendency for fluid to leak past the conical shaped surface of the overhanging portion 14, and as explained hereinbefore much of this leakage fluid is impelled to the opening 16 by the suction effect of the blades 15. However, should even the smallest amounts of fluid start to creep lengthwise along the outer surface of the flange 21, the creepage fluid is immediately blocked from traveling radially toward the shaft 26 by the relatively tight fit between the sealing ring 28 and the adjacent metal surface. It will be understood that the sealing ring is substantially stationary but may on occasion be permitted to precess as the impeller is rotated. But in any case there is relative movement between the sealing ring and the flange 21 which causes wear on the sealing ring and such wear may be taken up by tightening the set screws 44, which as explained hereinbefore exert a pressure in the longitudinal direction through the packing rings 35 on the cylindrical member 31.

It will be noted that the sealing ring 28 is of a symmetrical construction, so that should any undue wear be caused at the bearing surface which contacts the flange 21 the entire seal may be taken apart and the sealing member 28 reversed. It will be understood that the left hand side of the sealing ring is subjected to little or no wear because there is practically no relative movement between the ring and the flange portion 32 of the cylinder 31.

Should any of the creepage fluid tend to move lengthwise over the outer surface of the sealing ring 28 and get past the outer surface of the flange 32, any further passage of this fluid is completely blocked by the packing rings 35. The purpose of the springs 42 is to provide a continuous but resilient urge of the gland 36 toward the packing rings while the set screws 41 provide positive stops to any undue movement of the gland 36 in the left hand direction. It is apparent that the combined effect of the set screws 41 and the springs 42 is to maintain a steady and even force urging the gland 36 to the right and yet introduce into this force a flexible component resulting from the presence of the springs.

It is evident that the seal structure as described consists of simple parts and also may be readily assembled and disassembled for installation, inspection, or replacement purposes, necessitating only the fewest tools and the smallest number of operations. Yet a structure formed in the manner shown and described is very effective in preventing even the slightest leakage of fluid from a high pressure pump back along the shaft or into any other position where fluid of an acid-containing character may attack machinable metal parts.

In Figure 3 I have shown a modified form of the seal structure and in which completely independent adjustments may be obtained in applying pressure to the packing rings and to the sealing ring. Those parts having generally the same construction and purpose as the corresponding parts in Figure 1 have been given the same reference character.

Instead of providing a spacing ring 39 for the springs 43, the function of this ring is taken over by the sealing ring. Thus the sealing ring of graphite is formed as an elongated cylinder 55 which bears at one end against the flange 21, formed integrally with the impeller hub 17.

The rear wall 9 of the casing is foreshortened in the structure shown in Figure 3 but is provided at its inner bore with an annular recess 56 for receiving the packing rings 35. These rings directly surround the outer periphery of the graphite sealing ring 55 and inasmuch as the latter is prevented from rotating even in the slightest degree as will be explained hereinafter, there is little or no wear between the packing ring 35 and the ring 55.

In order to apply pressure against the packing rings 35 a cylindrical gland 57 is employed which is provided with four or more equidistantly spaced openings for receiving bolts 58 by which the gland is secured to the split ring 49. The gland 57 is provided at its inner periphery with an upturned projection 59 which has a width as measured in the radial direction sufficiently small to be received by the recess 56 and thus adapted to bear against the packing rings 35. It is therefore apparent that when the bolts 58 are tightened pressure can be exerted against the packing rings and cause them to press against the surface with which they come into contact.

In order to regulate or control the pressure exercised by the sealing ring 55 against the flange 21 a ring 60 may be employed, this ring having a flange portion 61 which loosely surrounds the ring 55. The ring 60 is provided with three or more equidistantly spaced openings 62 for loosely receiving bolts 63 which are adapted to be threadedly secured within the gland member 57. Thus by tightening the bolts 63 it is possible to move the ring 60 to the right. If desired, the gland member 57 may be provided with an annular recess 64 which can loosely accommodate the flange portion 61 of the ring 60 when the bolts 63 are tightened.

The ring 60 at the left hand end is provided with a circular bead 65 separated from the main portion of the ring by a groove 66 for preventing acid or other fluid from traveling along the surface of the ring. Directly opposite from the bead 65, the ring 60 is provided with a cupped back portion 67 which bears against a number of compression springs 68 contained within countersunk openings 69. These openings may extend lengthwise of the sealing ring 55 at the end adjacent the ring 60. If desired, the ring 55 may also be provided with a circular bead 70 together with a groove similar to the elements 65 and 66 of the ring 60.

It is apparent that as the bolts 63 are tightened pressure is exerted on the springs 68 to cause them to move the ring 55 to the right and thus to increase the pressure between this ring and the impeller flange 21. It will be noted that in the case of the structure shown in Figure 3 there is complete independence between the adjustment of the sealing ring and the flange 21 and also between the packing rings 35 and the downwardly projecting portion 71 formed on the rear wall of the pump casing.

The adjustment at the sealing ring 55 can be effected without altering in the slightest the adjustment at the packing rings 35, and the adjustment at the packing rings can be effected without altering in the slightest the adjustment at the sealing ring provided that when the bolts 58 are tightened to apply pressure to the packing rings the bolts 63 are loosened slightly to prevent such pressure from also being communicated to the sealing ring.

Due to this nicety of adjustment with respect to the seal structure shown in Figures 1 and 3, even the slightest amount of fluid is prevented from reaching the shaft 26 through any of the radial or longitudinal passageways and wear of the various sealing surfaces may be readily accommodated by suitable adjustment, and this adjustment may be applied to the specific sealing surface or area that needs adjustment without interference with the adjustment on the other sealing surface or area.

Whereas in Figure 1 the sealing ring 28 may be permitted to precess slightly if desired, it will be noted in Figure 3 the ring is held completely against rotation due to the friction exerted by the springs 68 against the stationary ring 60.

While I have described my invention as pertaining to that form of impeller on which the sealing flange 21 is integrally connected as by a casting operation, if desired, the flange member may be formed separately and secured in any other manner to the impeller. Moreover, the flange member 21 may also be formed on the shaft 26, although in general I prefer, mainly for less cost reasons, to cast the flange 21 directly on to the impeller hub.

While the apparatus herein disclosed and described constitutes a preferred form of the invention, yet it is to be understood that the apparatus is capable of mechanical alteration without departing from the spirit of the invention and that all such modifications as follow within the scope of the appended claims are intended to be included herein.

Having thus fully described my invention, what I claim as new and desire to secure by Letters Patent is:

1. A seal for a high pressure fluid pump including a shaft adapted to receive an impeller, a casing adapted to be mounted about the impeller, said casing having a hollow hub like portion surrounding the shaft but spaced therefrom to leave an annular compartment, a sealing ring in said compartment adapted to bear against said impeller and a cylindrical member surrounding the shaft and contained within said compartment for applying pressure to said ring to prevent leakage in the radial direction, said member having a flange which bears at one side against the ring and at the other side is adapted to receive a packing ring, and means for applying pressure against said packing ring to prevent leakage in the longitudinal direction, said means comprising a spacing ring containing equidistantly disposed compression springs which bear against a metal ring, said metal ring being in contact with said packing ring whereby said compression springs apply yielding pressure to said packing ring.

2. A seal for a high pressure fluid pump including a shaft adapted to receive an impeller, a casing adapted to be mounted about the impeller, said casing having a hollow hub like portion surrounding the shaft but spaced therefrom to leave an annular compartment, a sealing ring in said compartment adapted to bear against said impeller and a cylindrical member surrounding the shaft and contained within said compartment for applying pressure to said ring to prevent leakage in the radial direction, said member having a flange which bears at one side against the ring and at the other side is adapted to receive a packing ring, and means for applying pressure against said packing ring to prevent leakage in the longitudinal direction, said means comprising a spacing ring containing equidistantly disposed compression springs which bear against a metal ring, said metal ring being in contact with said packing ring whereby said compression springs apply yielding pressure to said packing rings, and means for adjusting the compression of said springs.

3. In a high pressure fluid pump including a shaft, an impeller on said shaft, and a casing having a hollow extension surrounding the shaft and spaced therefrom to define an annular compartment, a seal comprising a sealing ring in said compartment bearing against said impeller, a gland surrounding said shaft and contained within said compartment for applying pressure to said ring to prevent radial leakage, a flange on said gland bearing at one side against said ring, a packing ring on the other side of said flange, and means for applying pressure to said packing ring for preventing longitudinal leakage, said means including a cap member surrounding said gland, a spring within said cap member, and means for securing said cap member to said casing extension.

4. In a high pressure fluid pump including a shaft, an impeller on said shaft having an outwardly extending flange, and a casing having a hollow extension surrounding the shaft and spaced therefrom to define an annular compartment, a seal comprising a sealing ring in said compartment bearing against said flange, a gland surrounding said shaft and contained within said compartment for applying pressure to said ring to prevent radial leakage, a flange on said gland bearing at one side against said ring, a packing ring on the other side of said flange, and means for applying pressure to said packing ring for preventing longitudinal leakage, said means including a cap member surrounding said gland, a spring within said cap member, and means for securing said cap member to said casing extension.

5. A seal for a high pressure fluid pump including a shaft adapted to receive an impeller having an outwardly extending flange, a casing adapted to be mounted about the impeller, said casing having a hollow hub like portion surrounding the shaft but spaced therefrom to leave an annular compartment, a sealing ring in said compartment adapted to bear against said flange and a cylindrical member surrounding the shaft and contained within said compartment for applying pressure to said ring to prevent leakage in the radial direction, said member having a flange which bears at one side against the ring and at the other side is adapted to receive a packing ring, and means for applying pressure against said packing ring to prevent leakage in the longitudinal direction, said means comprising a spacing ring containing equi-distantly disposed compression springs which bear against a metal ring, said metal ring being in contact with said packing ring whereby said compression springs apply yielding pressure to said packing ring.

6. A seal for a high pressure fluid pump including a shaft adapted to receive an impeller having an outwardly extending flange, a casing adapted to be mounted about the impeller, said casing having a hollow hub like portion surrounding the shaft but spaced therefrom to leave an annular compartment, a sealing ring in said compartment adapted to bear against said flange and a cylindrical member surrounding the shaft and contained within said compartment for applying pressure to said ring to prevent leakage in the radial direction, said member having a flange which bears at one side against the ring and at the other side is adapted to receive a packing ring, and means for applying pressure against said packing ring to prevent leakage in the longitudinal direction, said means comprising a spacing ring containing equi-distantly disposed compression springs which bear against a metal ring, said metal ring being in contact with said packing ring whereby said compression springs apply yielding pressure to said packing rings, and means for adjusting the compression of said springs.

OYSTEIN JACOBSEN.

REFERENCES CITED

The following references are of record in the file of this patent:

UNITED STATES PATENTS

| Number | Name | Date |
| --- | --- | --- |
| 1,499,740 | Kolbe | July 1, 1924 |
| 1,528,334 | Hurd | Mar. 3, 1925 |
| 1,644,489 | Pitman | Oct. 4, 1927 |
| 1,849,912 | Daddysman | Mar. 15, 1932 |
| 1,880,911 | Durdin | Oct. 4, 1932 |
| 1,881,723 | Lee | Oct. 11, 1932 |
| 1,900,523 | Schmierer | Mar. 7, 1933 |
| 1,902,960 | LaBour | Mar. 28, 1933 |
| 1,924,407 | LaBour | Aug. 29, 1933 |
| 1,937,461 | Mylting | Nov. 28, 1933 |
| 2,020,436 | Shenton | Nov. 12, 1935 |
| 2,157,597 | Dupree | May 9, 1939 |
| 2,184,033 | Argant et al. | Dec. 19, 1939 |
| 2,233,599 | Gilbert | Mar. 4, 1941 |
| 2,247,505 | Kohler | July 1, 1941 |
| 2,291,346 | Robinson | July 28, 1942 |
| 2,402,995 | Garraway | July 2, 1946 |

FOREIGN PATENTS

| Number | Country | Date |
| --- | --- | --- |
| 24,955 | Great Britain | 1906 |